US010916392B2

(12) United States Patent
Ramesh Kumar et al.

(10) Patent No.: US 10,916,392 B2
(45) Date of Patent: Feb. 9, 2021

(54) REINFORCEMENT STRUCTURE FOR A VACUUM INTERRUPTER

(71) Applicant: Eaton Intelligent Power Limited, Dublin (IE)

(72) Inventors: Hemanth Kumar Ramesh Kumar, Oak Creek, WI (US); Paul N. Stoving, Oak Creek, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/539,267

(22) Filed: Aug. 13, 2019

(65) Prior Publication Data

US 2020/0090889 A1 Mar. 19, 2020

Related U.S. Application Data

(60) Provisional application No. 62/732,049, filed on Sep. 17, 2018.

(51) Int. Cl.
*H01H 33/662* (2006.01)
*B23K 1/00* (2006.01)
(Continued)

(52) U.S. Cl.
CPC ..... *H01H 33/66207* (2013.01); *B23K 1/0008* (2013.01); *B29C 45/14344* (2013.01);
(Continued)

(58) Field of Classification Search
CPC ... H01H 33/66207; H01H 2033/66215; H01H 2033/66223; H01H 2033/6623;
(Continued)

(56) References Cited

U.S. PATENT DOCUMENTS 4,124,790 A 11/1978 Kumbera et al.
4,394,554 A * 7/1983 Warabi ............. H01H 33/66207
218/134
(Continued)

FOREIGN PATENT DOCUMENTS

KR 20120102521 A 9/2012
KR 101321462 * 10/2013 ............. H01H 33/66

OTHER PUBLICATIONS

Translation KR101321462 (Original document published Oct. 28, 2013) (Year: 2013).*
(Continued)

*Primary Examiner* — William A Bolton
(74) *Attorney, Agent, or Firm* — DiBerardino McGovern IP Group LLC

(57) ABSTRACT

A reinforcement structure for a vacuum interrupter is disclosed. For example, in some implementations, a vacuum interrupter includes a first electrical contact; a second electrical contact; a vessel that encloses the first electrical contact and the second electrical contact in an evacuated space, the vessel including an endcap; and a reinforcement structure at an exterior surface of the endcap, the reinforcement structure including a first side, a second side, and an opening that passes through the reinforcement structure from the first side to the second side. The exterior surface of the endcap includes a recessed region, and at least a portion of the opening is positioned over the recessed region.

20 Claims, 6 Drawing Sheets

(51) Int. Cl.
  *B23K 101/36* (2006.01)
  *B29C 45/14* (2006.01)
  *B29L 31/34* (2006.01)
  *B29K 705/00* (2006.01)

(52) U.S. Cl.
  CPC ...... *B23K 2101/36* (2018.08); *B29K 2705/00* (2013.01); *B29L 2031/34* (2013.01); *H01H 2033/6623* (2013.01); *H01H 2033/66215* (2013.01); *H01H 2229/044* (2013.01)

(58) Field of Classification Search
  CPC ............ H01H 2229/044; B23K 1/0008; B23K 2101/36; B29C 45/14344; B29L 2031/34; B29K 2705/00
  USPC .................................. 218/139, 118, 134, 155
  See application file for complete search history.

(56) References Cited

U.S. PATENT DOCUMENTS

| | | | |
|---|---|---|---|
| 4,445,016 A * | 4/1984 | Sinnecker | H01H 33/66207 174/50.57 |
| 4,568,804 A * | 2/1986 | Luehring | H01H 33/66207 174/50.52 |
| 4,933,518 A * | 6/1990 | Yin | H01H 33/66207 218/134 |
| 5,222,651 A | 6/1993 | Pilsinger et al. | |
| 5,548,089 A | 8/1996 | Yamat | |
| 5,597,992 A | 1/1997 | Walker | |
| 5,736,705 A | 4/1998 | Bestel et al. | |
| 5,747,765 A | 5/1998 | Bestel et al. | |
| 5,747,766 A | 5/1998 | Wain et al. | |
| 5,768,079 A | 6/1998 | Buell | |
| 5,784,244 A | 7/1998 | Moran et al. | |
| 5,808,258 A * | 9/1998 | Luzzi | H01H 33/66207 218/136 |
| 5,917,167 A | 6/1999 | Bestel | |
| 6,201,676 B1 | 3/2001 | Glaser | |
| 6,331,687 B1 | 12/2001 | Dunk et al. | |
| 6,341,054 B1 | 1/2002 | Walder et al. | |
| 6,600,124 B1 | 7/2003 | Yamat | |
| 6,760,206 B2 | 7/2004 | Daharsh et al. | |
| 6,828,521 B2 | 12/2004 | Stoving et al. | |
| 6,858,172 B2 | 2/2005 | Daharsh et al. | |
| 6,867,385 B2 | 3/2005 | Stoving et al. | |
| 6,888,086 B2 | 5/2005 | Daharsh et al. | |
| 6,965,089 B2 | 11/2005 | Stoving et al. | |
| 6,973,589 B2 | 12/2005 | Wright et al. | |
| 7,133,271 B2 | 11/2006 | Jonas et al. | |
| 7,148,441 B2 | 12/2006 | Daharsh et al. | |
| 7,265,957 B2 | 9/2007 | Brucker | |
| 7,278,889 B2 | 10/2007 | Muench et al. | |
| 7,304,262 B2 | 12/2007 | Stoving et al. | |
| 7,403,130 B2 | 7/2008 | Brucker | |
| 7,473,863 B2 | 1/2009 | Schreiber et al. | |
| 7,488,916 B2 | 2/2009 | Muench et al. | |
| 7,495,574 B2 | 2/2009 | Rocamora et al. | |
| 7,633,741 B2 | 12/2009 | Hughes et al. | |
| 7,663,457 B2 | 2/2010 | Szeifert et al. | |
| 7,721,428 B2 | 5/2010 | Stoving et al. | |
| 7,772,515 B2 | 8/2010 | Stoving et al. | |
| 7,781,694 B2 | 8/2010 | Stoving | |
| 7,854,058 B2 | 12/2010 | Schreiber et al. | |
| 7,866,031 B2 | 1/2011 | Stoving et al. | |
| 7,887,732 B2 | 2/2011 | Daharsh et al. | |
| 8,087,166 B2 | 1/2012 | Stoving et al. | |
| 8,178,812 B2 | 5/2012 | Martin et al. | |
| 8,415,579 B2 | 4/2013 | Muench et al. | |
| 8,450,630 B2 | 5/2013 | Stoving | |
| 9,305,725 B2 * | 4/2016 | Yoshida | H01H 33/662 |
| 2011/0204030 A1 | 8/2011 | Mangan et al. | |

OTHER PUBLICATIONS

Valeri Pavlov, European International Searching Authority, International Search Report and Written Opinion, counterpart PCT Application No. PCT/EP2019/025308 dated Dec. 2, 2019, 12 pages total.

* cited by examiner

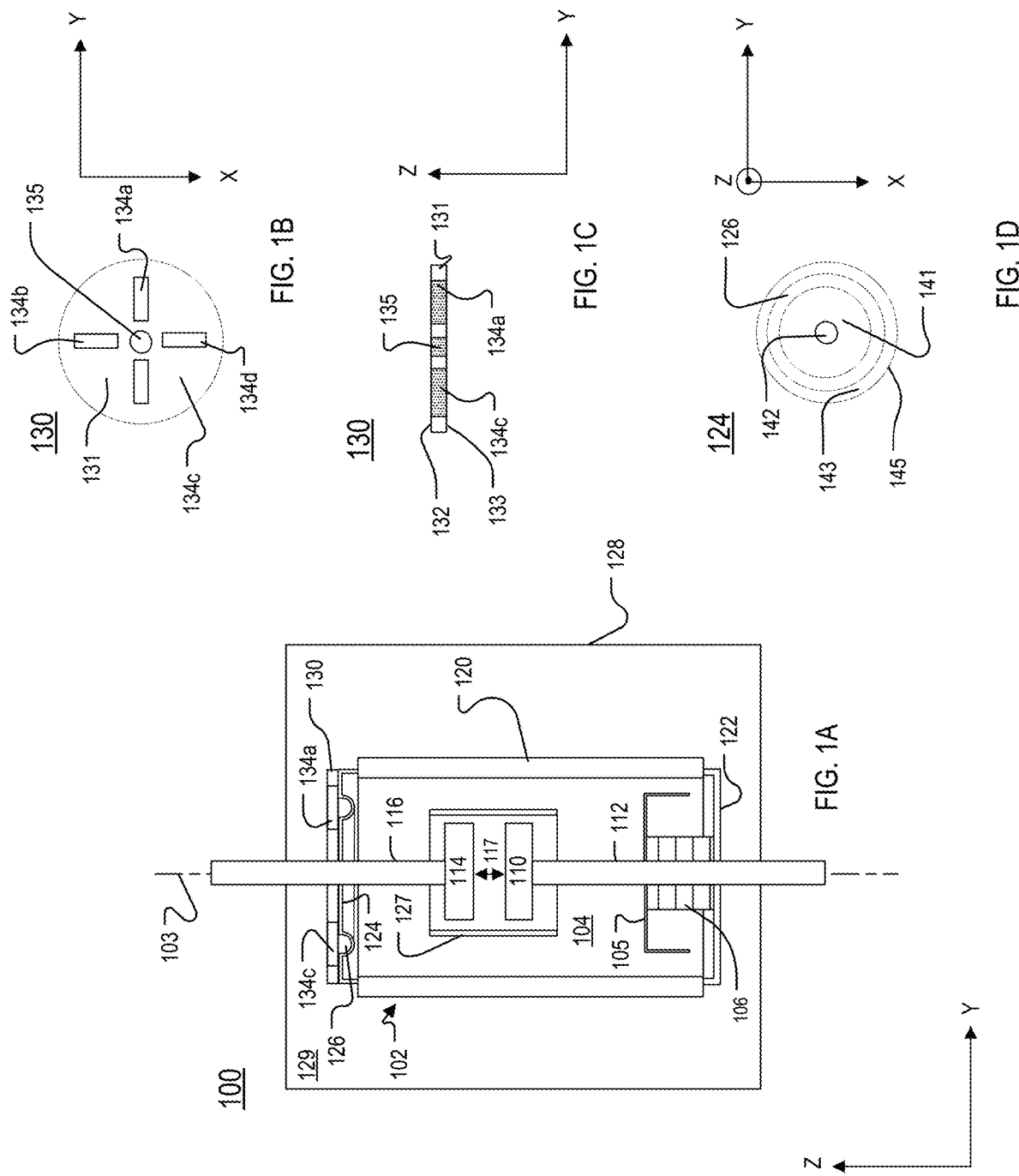

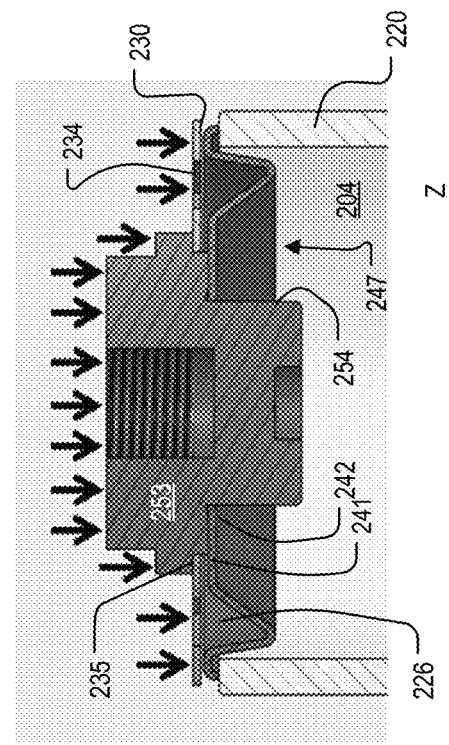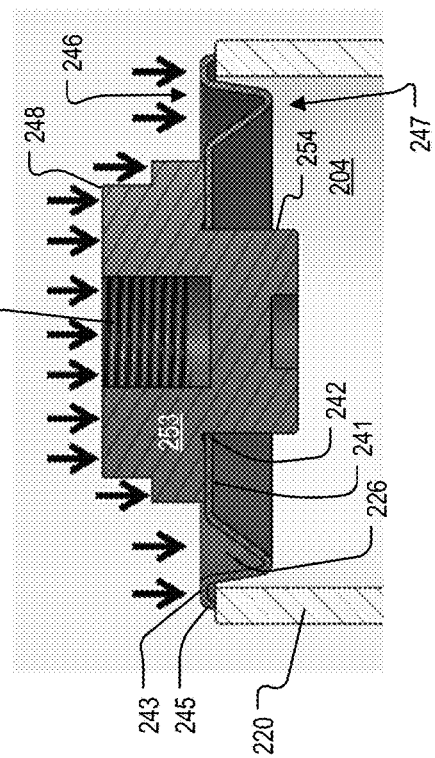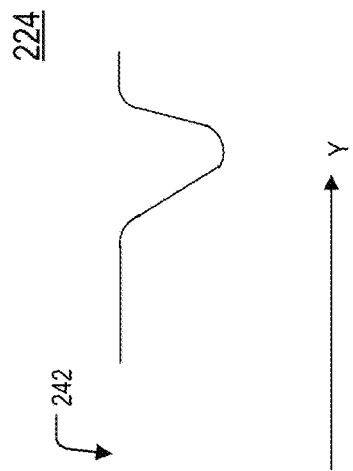
FIG. 2C
FIG. 2D
FIG. 2E

REINFORCEMENT STRUCTURE FOR A VACUUM INTERRUPTER

CROSS-REFERENCE TO RELATED APPLICATION

This application claims the benefit of U.S. Provisional Application No. 62/732,049, filed on Sep. 17, 2018 and titled REINFORCEMENT STRUCTURE FOR A VACUUM INTERRUPTER, which is incorporated herein by reference in its entirety.

TECHNICAL FIELD

This disclosure relates to a reinforcement structure for a vacuum interrupter.

BACKGROUND

Vacuum interrupters are used to protect electrical systems from electrical fault conditions, which may produce damaging high current or voltage transients. The vacuum interrupter includes a stationary contact and a movable contact, both of which are enclosed in a vessel designed to hold a vacuum. The movable contact moves relative to the stationary contact, moving the contacts into and out of electrical contact with each other. In this manner, the vacuum interrupter may interrupt the high current flow to the electrical system by opening the contacts.

SUMMARY

In one general aspect, a vacuum interrupter includes a first electrical contact; a second electrical contact; a vessel that encloses the first electrical contact and the second electrical contact in an evacuated space, the vessel including an endcap; and a reinforcement structure at an exterior surface of the endcap, the reinforcement structure including a first side, a second side, and an opening that passes through the reinforcement structure from the first side to the second side. The exterior surface of the endcap includes a recessed region, and at least a portion of the opening is positioned over the recessed region.

Implementations may include one or more of the following features. The recessed region may be a channel. The channel may be a single continuous channel that is concentric with a center of the vessel. The channel may surround a central region of the endcap.

The reinforcement structure may include more than one opening that passes through the reinforcement structure, and more than one opening may be positioned over the recessed region.

In some implementations, the recessed region initially includes a first fluid, and the opening is configured to allow a second fluid to flow into the recessed region such that at least some of the first fluid is replaced with the second fluid. The first fluid may include air, and the second fluid may include an encapsulation material.

The endcap may include a first portion, a second portion, and a third portion, the third portion may include an outer edge of the endcap, and at least a portion of the reinforcement structure may be positioned over the third portion of the endcap.

The endcap may include a first portion, a second portion, and a third portion, the third portion may include an outer edge of the endcap, the second portion may include the recessed region, the second portion may be between the first portion and the third portion, the first and third portions may extend in a plane that is substantially perpendicular to a longitudinal axis of the vessel, the reinforcement structure may extend in the plane that is substantially perpendicular to the longitudinal axis, and at least a portion of the reinforcement structure may extend in the plane beyond the outer edge of the endcap.

In some implementations, the vacuum interrupter also includes a cured encapsulating material that surrounds the vessel and is in the opening. In these implementations, during assembly of the vacuum interrupter, the encapsulating material is initially uncured, the opening is configured to allow fluid to flow between the first and second sides of the reinforcement structure, and the fluid includes one or more of the uncured encapsulating material and air.

The endcap may include copper, and the reinforcement structure may include steel, stainless steel, copper, or an alloy that includes copper and nickel.

In another general aspect, a reinforcement structure for an endcap of a vacuum interrupter includes a body. The body includes: a first side, a second side; and at least one opening that passes through the body from the first side to the second side. The at least one opening is configured to allow fluid to flow between the first side and the second side. The first side of the body is configured to be placed in contact with an exterior surface of the endcap of the vacuum interrupter prior to or concurrently with brazing the endcap to a vessel configured to enclose first and second electrical contacts.

Implementations may include one or more of the following features. The body may be steel, stainless steel, copper, an alloy of copper and nickel, or a non-oxidizing metallic material. The body may include more than one opening that passes through the body from the first side to the second side. The body may be a disk that includes a first portion, a second portion, and a third portion. In these implementations, the second portion may be between the first portion and the third portion, and the openings may be in the second portion. The disk may be an annulus.

In another general aspect, a method of assembling a vacuum interrupter includes providing a vessel body and at least one endcap, the vessel body including an insulating material, the at least one endcap including a metallic material; placing a first side of a reinforcement structure in contact with an exterior surface of the at least one endcap, the reinforcement structure including at least one opening that passes from the first side to a second side of the reinforcement structure; and assembling the vacuum interrupter by brazing the at least one endcap to the vessel body while the reinforcement structure is in contact with the exterior surface of the at least one endcap.

In some implementations, the exterior surface of the at least one endcap includes a channel, and placing the first side of the reinforcement structure in contact with the exterior surface of the at least one endcap includes positioning the reinforcement structure on the endcap such that at least a portion of the at least one opening is over at least a portion of the channel, and the method further includes: placing the vacuum interrupter in a mold; injecting an uncured encapsulating material into the mold, the uncured encapsulating material flowing into the channel through the at least one opening and air in the channel flowing out of the channel through the opening; and allowing the encapsulating material to cure.

In some implementations, placing the first side of the reinforcement structure in contact with an exterior surface of the at least one endcap includes brazing the first side of the reinforcement structure to a portion of the exterior surface of the at least one endcap, and brazing the first side of the reinforcement structure to the portion is concurrent with brazing the endcap to the vessel body.

In another general aspect, a reinforcement structure for an endcap of a vacuum interrupter includes a body, the body including: a first side; a second side; a first opening passing through the body from the first side to the second side, the first opening being configured to receive a portion of the endcap; and at least one other opening passing through the body from the first side to the second side. The reinforcement structure is configured to be mounted to the exterior of the endcap such that the first side of the body faces the exterior surface of the endcap, the second side of the body faces away from the endcap, and the at least one other opening is configured to fluidly couple a region between the first side and the exterior surface of the endcap to a region at the second side.

Implementations of any of the techniques described above may include a vacuum interrupter, a reinforcement structure for an endcap of a vacuum interrupter, and/or a method of assembling a vacuum interrupter. The details of one or more implementations are set forth in the accompanying drawings and the description below. Other features will be apparent from the description and drawings, and from the claims.

DRAWING DESCRIPTION

FIG. 1A is a block diagram of an example of a vacuum interrupter with a reinforcement structure.

FIG. 1B is a top view of an example of the reinforcement structure of FIG. 1A.

FIG. 1C is a side cross-sectional view of the reinforcement structure of FIG. 1B.

FIG. 1D is a top view of an endcap of the vacuum interrupter of FIG. 1A.

FIG. 2C is a side cross-sectional view of part of the vacuum interrupter of FIG. 2A.

FIG. 2D is a side cross-sectional view of part of the vacuum interrupter of FIG. 2B.

FIG. 2E is a profile of an example of an endcap of the vacuum interrupter of FIG. 2A or FIG. 2B.

DETAILED DESCRIPTION

Figure 2B:
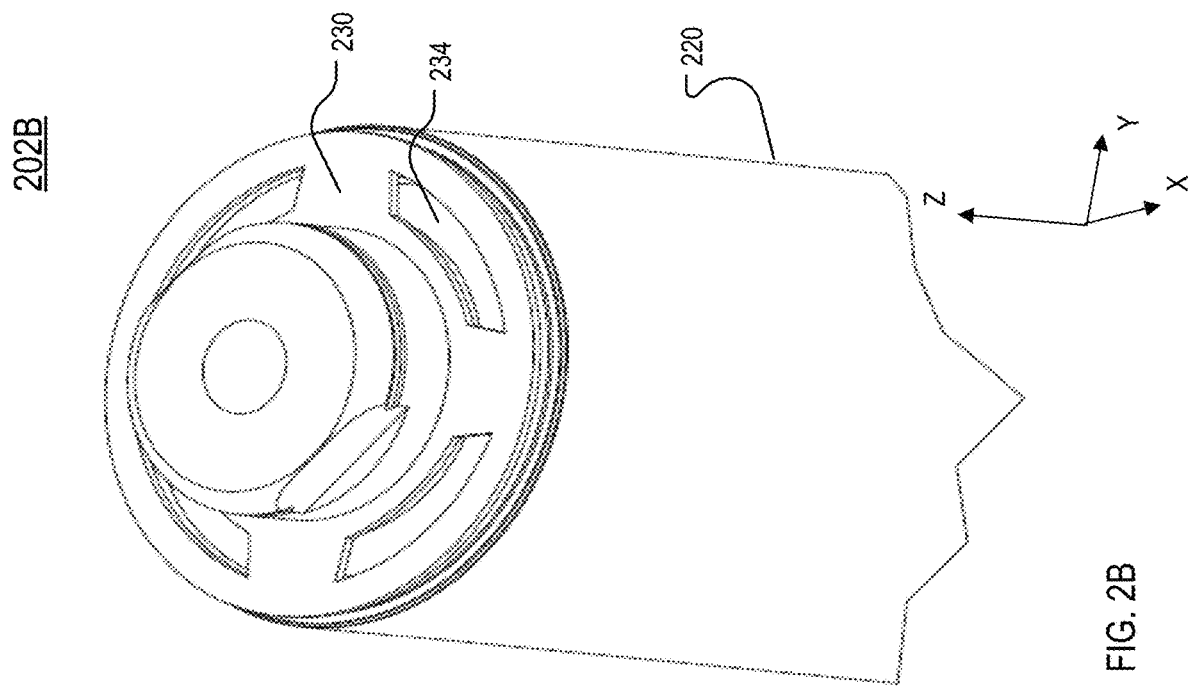
FIGS. 2A and 2B are partial views of an exterior of an example of a vacuum interrupter without and with a reinforcement structure, respectively.

A reinforcement structure for a vacuum interrupter is disclosed. The vacuum interrupter includes an insulating body to which endcaps are brazed to form a vessel, and the vessel may be encapsulated. The reinforcement structure is mounted at an endcap. The reinforcement structure provides mechanical support during the brazing and encapsulation processes. Further, the reinforcement structure includes openings or vents through which a flowable encapsulation material and air are able to pass to prevent or reduce the formation of air bubbles in the encapsulation material.

FIG. 1A is a block diagram of a vacuum interrupter 100. The vacuum interrupter 100 includes a vessel 102 that encloses a movable contact 110 and a stationary contact 114, which are respectively connected to a movable rod 112 and a stationary rod 116, in an evacuated space 104. The movable contact 110 and the stationary contact 114 are within a central shield 127. The movable rod 112 is operable to move the movable contact 110 relative to the stationary contact 114 along a longitudinal axis 103. The position of the movable contact 110 determines whether or not current flows through the vacuum interrupter 100. When the vacuum interrupter 100 is in an open position (FIG. 1A), the contacts 110, 114 are separated by a gap 117 and current does not flow through the vacuum interrupter.

The vessel 102 includes an insulating body 120 and endcaps 122, 124 that seal the insulating body 120 to allow a vacuum to be maintained within the vessel 102. A flexible bellows 106 extends from the endcap 122 into the vessel 102 and allows the movable rod 112 to move through the endcap 122 without the vessel 102 losing the vacuum seal. The insulating body 120 may be a cylindrical body. The insulating body 120 may be made of, for example, a ceramic or a dielectric material. The endcaps 122, 124 are brazed to a metalized surface of the insulating body 120 during a brazing process. The endcaps 122, 124 are made of a metallic material, such as, for example, copper. Heat is applied to the endcaps 122, 124 to braze them to the metalized surface of the insulating body 120.

The temperature used for brazing is fairly high, for example, 800-900 degrees (°) Celsius (C). The temperature of the brazing process may cause the endcaps 122, 124 to anneal and soften, leading to deformation of the endcap 122 and/or 124. Additionally, the weight of the insulating body 120 as well as the weight of any fixturing components (not shown) used to facilitate the brazing process may cause the softened endcap 122 and/or 124 to further deform. When the endcap 122 and/or 124 deforms, the items enclosed in the vessel 102 also may shift. For example, the endcap 124 may deform and collapse into the vessel 102 such that the stationary contact 114 shifts in the –Z direction. The shifting of the stationary contact 114 toward the movable contact 110 results in the gap 117 becoming smaller and may make it more difficult to operate the vacuum interrupter 100 properly. Additionally, the shifting of items within the vessel 102 may lead to loss of vacuum in the vessel 102, and/or higher electrical stress due to misalignment of the movable contact 110 and the stationary contact 114 relative to the central shield 127 in either the open or closed position.

A reinforcement structure 130 is used to prevent or mitigate deformation of the endcap 122 and/or the endcap 124. The reinforcement structure 130 may be placed on the endcap 122 or the endcap 124, or two reinforcement structures 130 may be used, one on the endcap 122 and the other on the endcap 124. The reinforcement structure 130 provides mechanical support during brazing to thereby mitigate or prevent deformation of the endcap 124. In the example of FIG. 1A, the reinforcement structure 130 is attached to the endcap 124, and the reinforcement structure 130 is discussed relative to the endcap 124. FIG. 1B is a top view of the reinforcement structure 130. FIG. 1C is a side cross-sectional view of the reinforcement structure 130. FIG. 1D is a top view of the endcap 124. The discussion below refers to FIGS. 1A-1D.

After the endcaps 122, 124 are brazed to the metalized surface of the insulating body 120, the vessel 102 is placed in a mold 128 that is then filled with an encapsulating material 129 during an encapsulation process. The encapsulating material 129 is liquefied or flowable when initially placed in the mold 128. After being placed in the mold, the encapsulating material 129 is cured and forms a solid insulating mass around the vessel 102. The encapsulating material 129 is any insulating material that has a flowable or liquefied form that is able to be cured into a solid insulating material. The encapsulating material 129 may be, for example, epoxy, rubber, and/or a thermoplastic.

In addition to the deformation of the endcap 122 and/or the endcap 124 that may occur during the brazing process, the endcap 122 and/or the endcap 124 may become deformed when the vessel 102 is encapsulated. The vessel 102 is encapsulated by adding the encapsulation material 129 to the mold 128 and applying pressure to the mold while the encapsulation material 129 cures. The encapsulation material 129, the insulating body 120, and the endcaps 122, 124 are made of materials that have different coefficients of linear thermal expansion. Thus, as the encapsulation material 129 cools, the material 129 shrinks at a different rate than the endcap 122, the endcap 124, and the insulating body 120. The applied pressure and/or the shrinking of the material 129 may deform the endcap 122 and/or the endcap 124, causing the overall length of the vessel 102 to change and/or moving items within the vessel 102. Some prior manufacturing processes addressed the deformation of the endcaps by holding the movable rod 112 and/or the stationary rod 116 in place while the encapsulating material cured. However, holding the rods in place during the encapsulating process slows down the manufacturing process and is not practical.

In addition to mitigating or preventing deformation that may occur during the brazing process, the reinforcement structure 130 addresses the issues that may arise during the encapsulation process. The reinforcement structure 130 provides mechanical support during the encapsulation process, and openings 134 in the reinforcement structure 130 prevent or reduce the occurrence of air bubbles in the encapsulation material 129, as discussed below.

Referring also to FIGS. 1B and 1C, the reinforcement structure 130 includes a body 131 made of a solid and durable material. For example, the body 131 may be made of steel, stainless steel, copper, a metal alloy, or a non-oxidizing material. The body 131 includes a first side 132 and a second side 133 that is opposite to the first side 132. The reinforcement structure 130 includes openings 134*a*, 134*b*, 134*c*, 134*d* (collectively referred to as the openings 134). Each of the openings 134 passes through the body 131. In the example of FIGS. 1A-1C, the body 131 defines four openings (the openings 134*a*-134*d*) that are equidistant from each other. The openings 134 are in addition to a center passage 135 that accommodates the rod 116. In FIG. 1C, the openings 134 and the center passage 135 are shaded with a dotted pattern to further distinguish these elements from the body 131.

Figure 3:
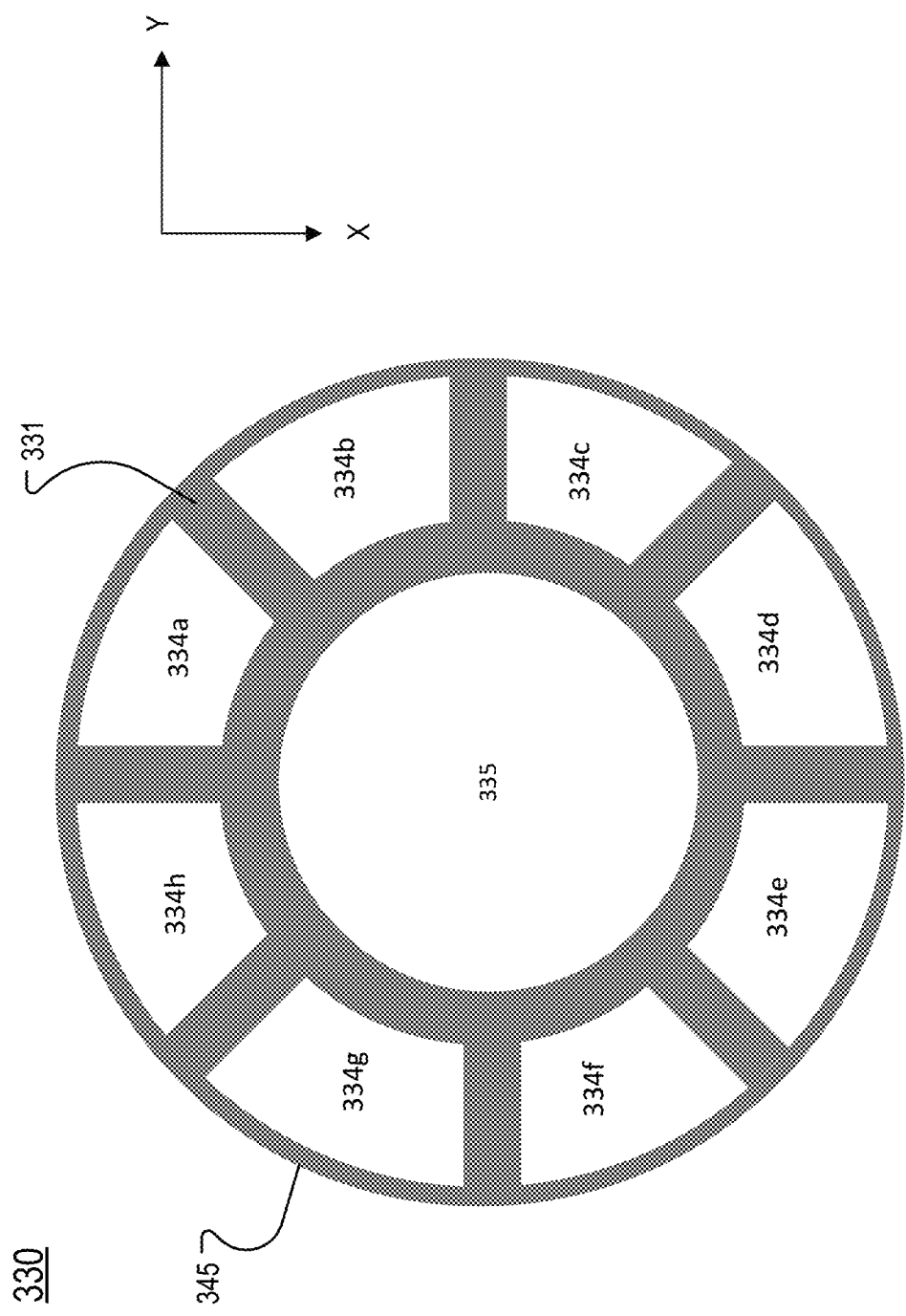
FIG. 3 is a top view of another example of a reinforcement structure.
Figure 5A:
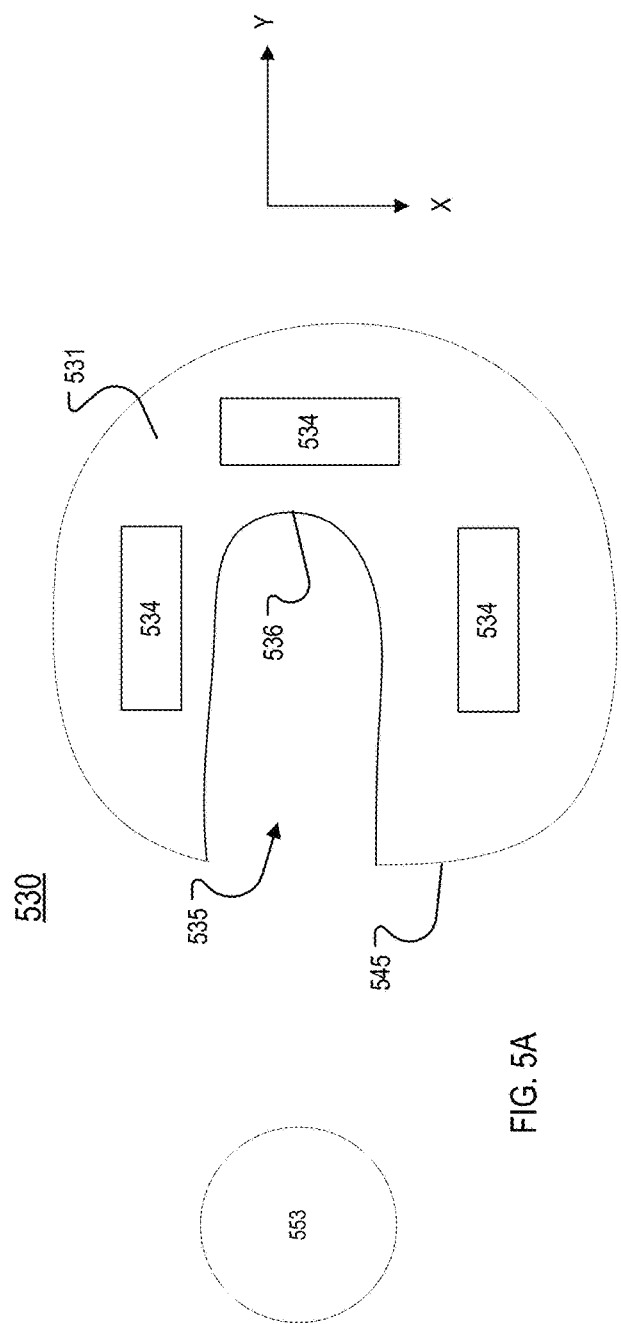
FIG. 5A is a top view of another example of a reinforcement structure.

In the example of FIGS. 1B and 1C, each of the openings 134 is a rectangular shaped slot. However, other configurations are possible. For example, the body 131 may define more or fewer than four openings, the openings may have any shape, and the openings may be positioned in any manner. FIGS. 2B, 3, and 5A show other examples of reinforcement structures.

Referring also to FIG. 1D, the endcap 124 includes a central portion 141 that includes a region 142 through which the rod 116 passes or is attached. The endcap 124 also includes an outer portion 143, which includes an outer edge 145 of the endcap 124. A channel or recessed region 126 is between the central portion 141 and the outer portion 143.

The outer portion 143 is rigid along the Z axis due to proximity to the outer edge 145. In other words, the outer portion 143 flexes very little or not at all in the Z direction or the –Z direction. The recessed region 126 acts as a spring that absorbs radial stress between the endcap 124 and the insulating body 120. For example, during the brazing process and during the encapsulation process, the temperature of the endcap 124 and the insulating body 120 change (heat or cool). The endcap 124 and the insulating body 120 are made of materials that have different coefficients of linear thermal expansion. Thus, the length of the endcap 124 and the insulating body 120 in the X-Y plane change by different amounts for the same change in temperature. The recessed region 126 absorbs radial stress that may arise from the difference between the coefficient of linear thermal expansion of the material of the endcap 124 and the material of the insulating body 120. The recessed region 126 decouples the central portion 141 from the outer portion 143 such that the central portion 141 is able to flex along the Z axis even though the outer portion 143 is rigid.

The reinforcement structure 130 is permanently attached (for example, by brazing) to the central portion 141 of the endcap 124 prior to brazing the endcap 124 to the insulating body 120 or at the same time that the endcap 124 is brazed to the insulating body 120. If the endcap 124 deforms, the outer portion 143 of the endcap 124 comes into contact with the reinforcement structure 130, and the reinforcement structure 130 prevents further deformation such that the deformation of the endcap 124 is minimized.

Each of the endcap 124, the insulating body 120, and the reinforcement structure 130 has a substantially circular shape in the X-Y plane. However, the endcap 124, the insulating body 120, and the reinforcement structure 130 may have other shapes in the X-Y plane. The reinforcement structure 130 has the same diameter in the X-Y plane as the endcap 124, and the reinforcement structure 130 extends over the entire outer portion 143 of the endcap 124. Other implementations are possible. For example, in some implementations, the reinforcement structure 130 extends over only part of the outer portion 143 such that the reinforcement structure 130 does not extend to the outer edge 145 of the endcap 124. Furthermore, in some implementations, the reinforcement structure 130 has a greater diameter in the X-Y plane than the endcap 124, and, when placed on the endcap 124, the reinforcement structure 130 extends beyond the outer edge 145 of the endcap 124.

When the reinforcement structure 130 is placed on the endcap 124, one of the sides 132, 133 makes contact with an exterior side of the endcap 124. Thus, the reinforcement structure 130 is not intended to be in the evacuated space 104. The other of the sides 132, 133 faces away from the endcap 124. At least a portion of each of the openings 134 of the reinforcement structure 130 overlap (are positioned over) the recessed region 126 of the endcap 124. Thus, air may pass between the recessed region 126 and the interior of the mold 128 via the openings 134.

During the encapsulation process, the openings 134 allow liquefied or flowable encapsulation material 129 to flow into the recessed region 126, and the openings 134 also allow air that is in the recessed region 126 to escape. The flow of air and/or encapsulation material 129 through the openings 134 prevents or mitigates the formation of air bubbles in the cured encapsulation material 129. The presence of air bubbles or other voids may compromise the strength of a structure formed by the cured encapsulation material 129, for example. Thus, the vacuum interrupter 100 is more robust than a vacuum interrupter formed without the reinforcement structure 130.

In some prior systems, for example, as discussed in U.S. Pat. No. 6,867,385, air was specifically maintained in a region similar to the recessed region 126. In U.S. Pat. No. 6,867,385, a cover 1025 was used to enclose a loop or concavity formed in an endcap 1005. The loop or concavity was covered with the cover 1025 such that an air cavity was intentionally maintained within the concavity. The cover 1025 discussed in U.S. Pat. No. 6,867,385 was specifically intended to trap air in the concavity and is therefore different from the reinforcement structure 130, which allows fluids (such as air and/or the liquefied encapsulation material 129) to flow into and out of the recessed region 126 via the openings 134.

In another example, U.S. Pat. No. 8,178,812 discloses a strengthening cover-plate 26 that is fitted onto an end cover 6 of a vacuum cartridge 1 before the insert molding process but after the brazing process. In U.S. Pat. No. 8,178,812, a sealing means was positioned between the strengthening cover-plate 26 and a ceramic tube 4 to eliminate infiltration of elastomer. However, the strengthening cover-plate 26 of U.S. Pat. No. 8,178,812 does not include any features though which an encapsulation material and air are able to flow. On the contrary, U.S. Pat. No. 8,178,812 teaches that it is "preferable to position sealing means between the cover-plate 26 and ceramic tube 4 to eliminate infiltration of elastomer that is liable to stress the braze 8 and to thereby prevent deformation of the switchgear device." Furthermore, as shown in FIG. 2 of U.S. Pat. No. 8,178,812, a spacer 34 is between the strengthening cover-plate 26 and the end cover 6. The spacer 34 prevents the strengthening cover-plate 26 and the end cover 6 from making direct contact and also creates a space for air between the strengthening cover-plate 26 and the cover 6. This is in contrast to the reinforcement structure 130 of the present disclosure, which is able to make direct contact with the endcap 124 and includes at least one opening 134 through which the encapsulation material 129 may pass into the recessed region 126. Thus, although air may initially be in the recessed region 126, the presence of the openings 134 ensures that the air is able to escape and be replaced by a flowable form of the encapsulation material 129.

U.S. Pat. No. 4,124,790 relates to a submersible protective switch, which includes a vacuum enclosure 19. The vacuum enclosure 19 includes power interrupt contacts 27 and 28 within a centrally located shield assembly 26. The vacuum enclosure 19 is encapsulated in a solid insulation housing 23 that forms a self-supporting structure. A disk 33 is brazed to a connector 31 that has a contact terminal to receive a line contact. A cup-shaped end cap 36 abuts the disk 33 and encloses an assembly. The outer surface of the vacuum enclosure 19 and extended, fixed contact housing assembly elements 33, 35 and 36 and front contact assembly elements 42 and 43 are coated with a layer 50 of a resilient or flexible material such as rubber. The cup-shaped end cap 36 discussed in U.S. Pat. No. 4,124,790 differs from the reinforcement structure 130 at least because the cup-shaped end cap 36 is added after brazing. Additionally, the end cap 36 is coated in the resilient material and does not include any features similar to the openings 134, which allow a space formed in an endcap to be filled with the encapsulation material 129. As shown in FIG. 3 of U.S. Pat. No. 4,124,790, the space formed by the end cap 36 is intended to remain a void. Thus, U.S. Pat. No. 4,124,790 does not disclose an opening in the end cap 36 through which a material that forms the housing 23 is able to pass.

The reinforcement structure 130 is different from these prior systems because the reinforcement structure 130 includes the openings 134, which are designed to allow fluid flow into and out of the recessed region 126 while the reinforcement structure 130 is attached to the endcap 124. Moreover, the reinforcement structure 130 is on the endcap 124 while the endcap 124 is brazed to the insulating body 120. Thus, the reinforcement structure 130 provides support during the brazing process and the encapsulation process.

Figure 2A:
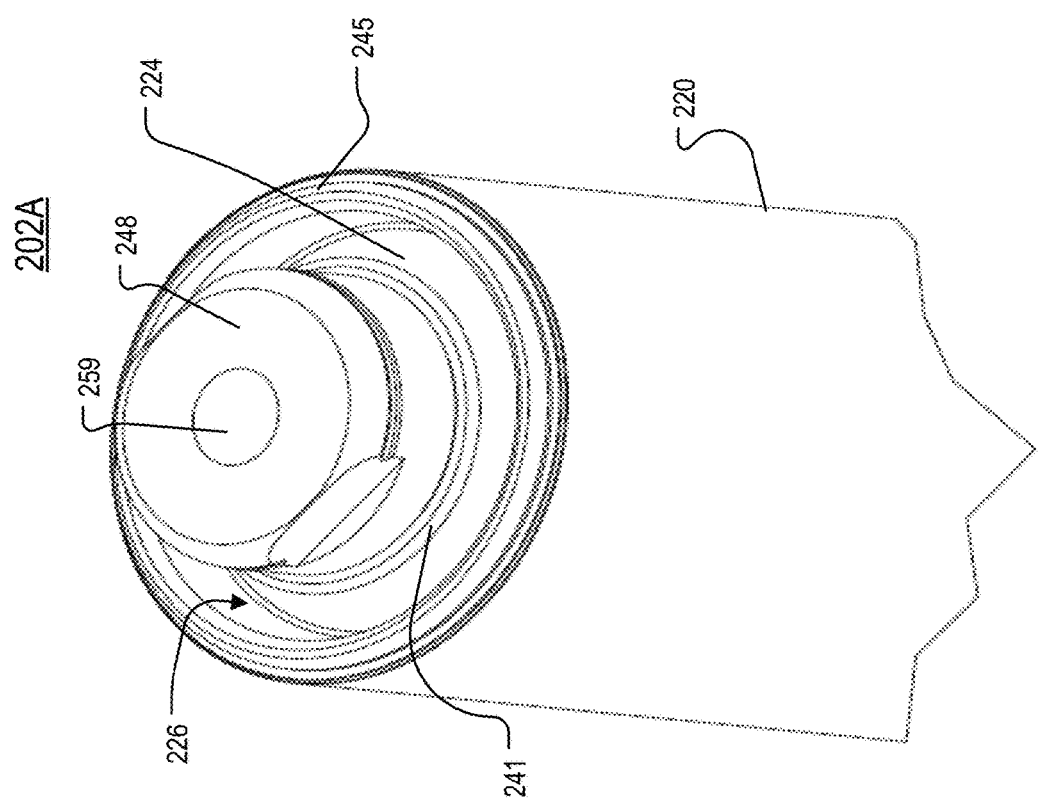

FIGS. 2A and 2B are perspective partial exterior views of example vacuum vessels 202A and 202B, respectively. FIGS. 2C and 2D are cross-sectional views of the vacuum vessels 202A and 202B, respectively, in the Y-Z plane. The vacuum vessel 202A is the same as the vacuum vessel 202B, except the vacuum vessel 202B includes a reinforcement structure 230.

Referring to FIGS. 2A-2D, each of the vacuum vessels 202A, 202B includes an insulating body 220 and an endcap 224. The endcap 224 (and an endcap at an opposite end of the insulating body 220 that is not shown) seal an interior 204 of the insulating body 220. The vacuum vessels 202A, 202B also include a structure 253. The structure 253 includes a conductive disk 248, which is outside of the interior 204, and a conductive protrusion 254, which extends into the interior 204. The conductive disk 248 includes a receptacle 259 that includes features (for example, threads) that facilitate the connection of a conducting rod (such as the rod 116 shown in FIG. 1A). The endcap 224 includes an open region 242. The open region 242 surrounds an exterior of the protrusion 254. Although the protrusion 254 extends into the interior 204, the open region 242 is positioned relative to the protrusion 254 and the insulating body 220 such that a side 246 (FIG. 2C) of the endcap 224 faces away from the interior 204 and a side 247 (FIGS. 2C and 2D) faces into the interior 204. The side 246 is an exterior side of the endcap 224. The endcap 224, the conductive disk 248, and the insulating body 220 have substantially circular cross sections.

Referring also to FIG. 2E, which is a profile of the endcap 224 along the Y direction, the endcap 224 also includes a central portion 241, which surrounds the open region 242, and a recessed region 226. The endcap 224 also includes an outer portion 243 that includes an outer edge 245 of the endcap 224. The recessed region 226 is a continuous channel that surrounds the central portion 241. The recessed region 226 is between the outer portion 243 and the central portion 241. The recessed region 226 absorbs radial stress between the insulating body 220 and the endcap 224.

The recessed region 226 is formed by channel portions 256a and 256b, which are joined at a curved turning point 257. The channel portion 256a is connected to the outer portion 243, and the channel portion 256b is connected to the central portion 241. The central portion 241, the channel portions 256a and 256b, the curved turning point 257, and the outer portion 243 are all formed from an electrically conductive material. When viewed from the top (in the X-Y plane) separately from the vessel 202A or the vessel 202B, the endcap 224 is a disk-shaped structure made of a solid, electrically conductive material that is open at the open region 242.

The profile of the recessed region 226 is determined by the shapes of the channel portions 256a and 256b and the curvature of the turning point 257. The spring constant of the recessed region 226 depends on the arrangement of the channel portions 256a, 256b and on the curvature of the curved turning point 257. Thus, the ability of the recessed region 226 to absorb radial stress between the insulating body 220 and the endcap 224 may be tuned by changing the size, shape, and/or orientation of the channel portions 256a, 256b, and/or the curvature of the curved turning point 257.

In the example of FIG. 2E, the profile of the recessed region 226 does not have mirror symmetry about the curved turning point 257. That is, the channel portions 256a and 256b have different lengths and are positioned at different angles relative to the outer portion 243 and the central portion 241, respectively. However, the profile of the recessed region 226 may be different than the profile shown in FIG. 2E. For example, the recessed region 226 may have mirror symmetry about the curved turning point 257. In another example, in some implementations, the recessed region 226 is a step, with either 256a or 256b having a near-zero length.

FIGS. 2B and 2D show the reinforcement structure 230 on the side 246 of the endcap 224. The reinforcement structure 230 includes openings 234 that are positioned over the recessed region 226 of the endcap 224. The openings 234 allow air and other fluids to enter and leave the recessed region 226. The reinforcement structure 230 includes a central passage 235 that is placed around the conductive disk 248. In the example of FIG. 2D, the central passage 235 overlaps the central region 241 of the endcap 224, and the central region 241 of the endcap 224 is around the protrusion 254.

While the reinforcement structure 230 is mounted on the endcap 224, the endcap 224 is brazed to the insulating body 220, and the vessel 202B may be encapsulated with the encapsulation material 129 (FIG. 1). Similar to the reinforcement structure 130 discussed with respect to FIGS. 1A-1D, the reinforcement structure 230 provides mechanical support to the endcap 224 during the brazing process and the encapsulation process. For example, the encapsulation material 129 may exert a force along the −Z direction (the direction of such a force is shown by arrows in FIGS. 2C and 2D), and the reinforcement structure 230 prevents this force from deforming the endcap 224. Additionally, the openings 234 in the reinforcement structure 230 also allow fluid to flow into and out of the recessed region 226 during the encapsulation process to prevent or mitigate formation of air bubbles in the encapsulation material.

FIG. 3 is a top view of a reinforcement structure 330. The reinforcement structure 330 is another example of an implementation of the reinforcement structure 130 (FIGS. 1A-1C). The reinforcement structure 330 is mounted to an endcap of a vacuum vessel (such as the vessel 102 of FIG. 1A or the vessel 202 of FIG. 2A). A vacuum vessel typically has more than one endcap. The reinforcement structure 330 may be mounted on one, all, or some of the endcaps.

The reinforcement structure 330 includes a body 331. The body 331 is made of a solid, durable material such as, for example, steel, stainless steel, or a metal alloy that includes copper and nickel. In FIG. 3, portions of the reinforcement structure 330 that are the body 331 are shaded grey, and the body 331 is a disk or annulus. The body 331 defines a central passage 335, which passes through the body 331 and allows the reinforcement structure 330 to be placed around particular regions of the endcap 224 or other structures that protrude from the vacuum vessel in the Z direction. For example, the central passage 335 may be placed around the central region 241 of the endcap 224 (FIG. 2A) or around the conductive disk 248 (FIG. 2A).

The reinforcement structure 330 also includes openings 334a-334h (collectively referred to as the openings 334).

The openings 334 are distinct from each other and are separated from each other by regions of the body 331. The reinforcement structure 330 has a circular shape, and the openings 334 are between the central passage 335 and an outer edge 345 of the reinforcement structure 330. Each of the openings 334 passes through the body 331. Thus, fluid is able to flow through the openings 334, but the portions of the reinforcement structure 330 that are not openings 334 still provide mechanical support to the endcap to which the reinforcement structure 330 is mounted. Like the reinforcement structures 130 and 230, the reinforcement structure 330 provides mechanical support during brazing and encapsulation. Additionally, the presence of the openings 334 prevents or reduces formation of air bubbles in the material used to encapsulate a vacuum vessel that includes the reinforcement structure 330.

Figure 4:
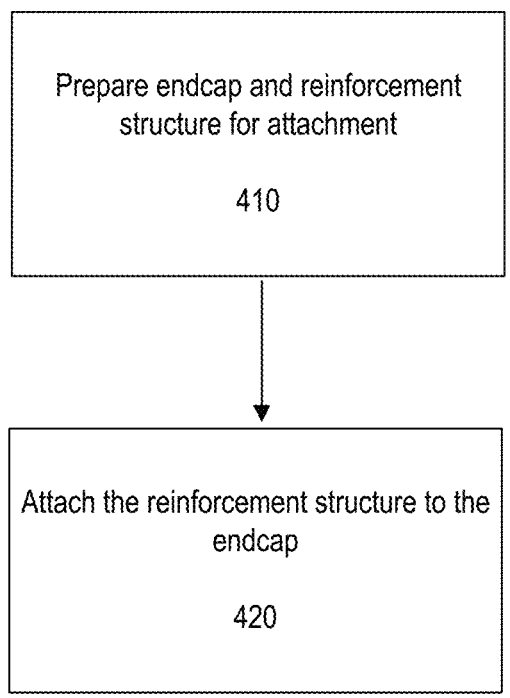
FIG. 4 is a flow chart of an example of a process for attaching or mounting a reinforcement structure to an endcap of a vacuum interrupter.

FIG. 4 is a flow chart of an example of a process 400 for attaching or mounting a reinforcement structure to an endcap of a vacuum interrupter. The process 400 is discussed with respect to the reinforcement structure 130 and the endcap 124 (FIG. 1A-1D). However, the process 400 may be used to attach other reinforcement structures to the endcap 124 or to another endcap. The process 400 is performed prior to the encapsulation process. The process 400 may include brazing, and the brazing performed as part of the process 400 is prior to or concurrent with the brazing process by which the endcap 124 is attached to the insulating body 120. Brazing the reinforcement structure 130 to the endcap 124 while the endcap 124 is being brazed to the insulating body 120 may result in prevention or minimization of cumulative oxidation and/or nitration and also reduces annealing steps, which can soften the heated components.

The reinforcement structure 130 and the endcap 124 are prepared for attachment (410). For example, a washer of braze alloy may be placed between the reinforcement structure 130 and the endcap 124. The washer may be, for example, an alloy made of copper, silver, and/or nickel.

Preparing the reinforcement structure 130 and the endcap 124 for attachment also includes positioning the reinforcement structure 130 and the endcap 124 in the proper relative positions. For example, the reinforcement structure 130 is positioned relative to the endcap 124 such that the opening 134 is over the recessed region 126.

The reinforcement structure 130 is permanently attached to the endcap 124 (420). Continuing the example of (410), the reinforcement structure 130 is brazed to the endcap 124 by applying sufficient heat to cause the braze washer to melt such that the reinforcement structure 130 becomes fixed to the endcap 124. The reinforcement structure 130 is only brazed to the central portion 141 of the endcap 124. The reinforcement structure 130 is not brazed to the outer portion 143 of the endcap 124 or to the outer edge 145 of the endcap 124. If the reinforcement structure 130 was brazed to the outer portion 143 and the central portion 141 of the endcap 124, the endcap 124 would become too rigid, and the endcap 124 would not be able to absorb stresses from the brazing process (the process by which the endcaps 124 and 122 are attached to the insulating body 120) or stresses due to the curing of the encapsulation material 129.

In some implementations, a small gap or space is intentionally formed between the outer portion 143 and the reinforcement structure 130 along the Z direction. This space may help to ensure that the reinforcement structure 130 does not become brazed to the outer portion 143 and is only brazed to the central portion 141. In implementations that have a gap between the outer portion 143 and the reinforcement structure 130, the outer portion 143 of the endcap 124 may be displaced along the Z direction relative to the central portion 141, and/or the reinforcement structure 130 may be non-planar such that an outer region of the reinforcement structure 130 is displaced in the Z direction relative to a portion near the central passage 135.

Figure 5B:
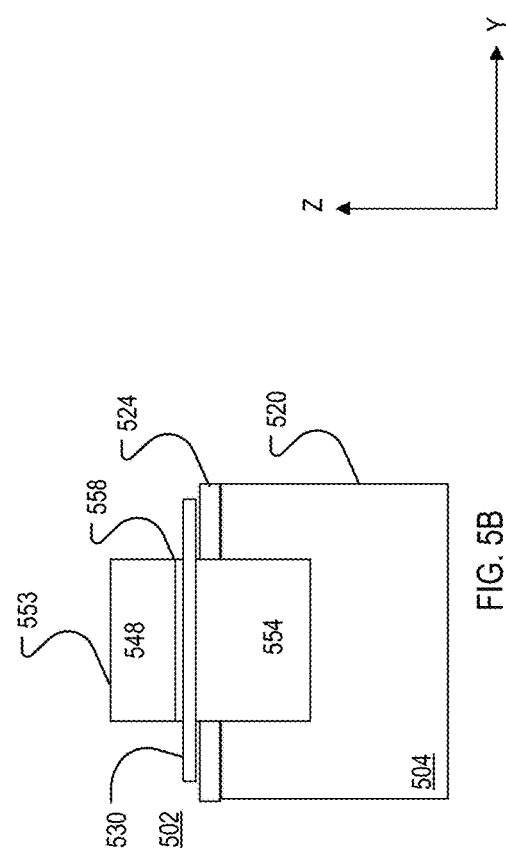
FIG. 5B is a side cross-sectional view of the reinforcement structure of FIG. 5A mounted to a vacuum interrupter.

FIG. 5A is a top view of a reinforcement structure 530 and a structure 553. FIG. 5B is a side cross-sectional view of a vacuum vessel 504 that includes the structure 553. The reinforcement structure 530 is another example of an implementation of the reinforcement structure 130 (FIGS. 1A-1C). The reinforcement structure 530 may be used to retrofit a vacuum vessel that is already assembled. For example, the reinforcement structure 530 may be used to retrofit a vacuum vessel in which the moving actuation rod and/or the conducting rod is already installed into the endcap (or a conductive disk at the endcap) or in any other situation in which it would be challenging or impossible to place a reinforcement structure over a portion of the endcap.

The reinforcement structure 530 includes a body 531 that is made of a solid material. A placement passage 535 extends from the center of the reinforcement structure 530 to an outer edge 545. The placement passage 535 passes all the way through the body 531 and forms an open region in the body 531. The reinforcement structure 530 also includes openings 534 that are distinct from the placement passage 535 and are not at the center of the reinforcement structure 530. The openings 534 also pass all the way through the body 531.

In the example shown in FIG. 5A, the reinforcement structure 530 is installed onto the structure 553. The structure 553 is similar to the structure 253 (FIGS. 2A-2D), except the structure 553 includes a receiving slot 558 (FIG. 5B). To install the reinforcement structure 530 onto the structure 553, the reinforcement structure 530 is slid onto the structure 553 with the placement passage 535 aligned with the receiving slot 558. The reinforcement structure 530 is pushed toward the structure 553 in the X-Y plane until an edge 536 of the placement passage 535 is received in the receiving slot 558 and meets the structure 553. When the edge 536 is received in the receiving slot 558, the reinforcement structure 530 is installed, and the openings 534 are positioned over a recessed region of the endcap such that fluid (including air) is able to flow into and out of the recessed region. In some implementations, the placement passage 535 may have a non-uniform width such that the reinforcement structure 530 snaps into position in a manner similar to a retaining ring.

Other implementations are within the scope of the claims. For example, the reinforcement structure may be integral with the endcap that it protects. In other words, the reinforcement structure and the endcap may be formed as a single piece.

What is claimed is:

1. A vacuum interrupter comprising:
   a first electrical contact;
   a second electrical contact;
   a vessel that encloses the first electrical contact and the second electrical contact in an evacuated space, the vessel comprising an endcap; and
   a reinforcement structure at an exterior surface of the endcap, the reinforcement structure comprising a first side, a second side, and an opening that passes through the reinforcement structure from the first side to the second side, wherein the exterior surface of the endcap comprises a recessed region, and at least a portion of the opening is positioned over the recessed region, and wherein the recessed region initially includes a first fluid, and the opening is configured to allow a second fluid to flow into the recessed region such that at least some of the first fluid is replaced with the second fluid.

2. The vacuum interrupter of claim 1, wherein the recessed region comprises a channel.

3. The vacuum interrupter of claim 2, wherein the channel is a single continuous channel that is concentric with a center of the vessel.

4. The vacuum interrupter of claim 3, wherein the channel surrounds a central region of the endcap.

5. The vacuum interrupter of claim 1, wherein the reinforcement structure comprises more than one opening that passes through the reinforcement structure, and more than one opening is positioned over the recessed region.

6. The vacuum interrupter of claim 1, wherein the first fluid comprises air, and the second fluid comprises an encapsulation material.

7. The vacuum interrupter of claim 1, wherein
   the endcap comprises a first portion, a second portion, and a third portion,
   the third portion comprises an outer edge of the endcap, and
   at least a portion of the reinforcement structure is positioned over the third portion of the endcap.

8. The vacuum interrupter of claim 1 wherein
   the endcap comprises a first portion, a second portion, and a third portion,
   the third portion comprises an outer edge of the endcap, and
   the second portion comprises the recessed region,
   the second portion is between the first portion and the third portion,
   the first and third portions extend in a plane that is perpendicular to a longitudinal axis of the vessel,
   the reinforcement structure extends in the plane that is perpendicular to the longitudinal axis, and
   at least a portion of the reinforcement structure extends in the plane beyond the outer edge of the endcap.

9. The vacuum interrupter of claim 1, further comprising a cured encapsulating material that surrounds the vessel and is in the opening, and wherein, during assembly of the vacuum interrupter, the encapsulating material is initially uncured, and the second fluid comprises the uncured encapsulation material.

10. The vacuum interrupter of claim 1, wherein the endcap comprises copper, and the reinforcement structure comprises steel, stainless steel, copper, or an alloy comprising copper and nickel.

11. The vacuum interrupter of claim 1, wherein the reinforcement structure is in contact with at least a portion of the exterior surface of the endcap.

12. The vacuum interrupter of claim 11, wherein the reinforcement structure is in contact with all of the exterior surface of the endcap except for the recessed region.

13. A reinforcement structure for an endcap of a vacuum interrupter, the reinforcement structure comprising:
    a body comprising: a first side; a second side; and openings that pass through the body from the first side to the second side, the openings configured to allow fluid to flow between the first side and the second side, wherein
    the first side of the body is configured to be placed in contact with an exterior surface of the endcap of the vacuum interrupter prior to or concurrently with brazing the endcap to a vessel configured to enclose first and second electrical contacts, and at least one of the openings is configured to be placed over a recessed region of the endcap.

14. The reinforcement structure of claim 13, wherein the body comprises a disk,
the disk comprises a first portion, a second portion, and a third portion,
the second portion is between the first portion and the third portion, and
the openings are in the second portion.

15. The reinforcement structure of claim 14, wherein the disk comprises an annulus.

16. The reinforcement structure of claim 13, wherein the body comprises steel, stainless steel, copper, an alloy of copper and nickel, or a non-oxidizing metallic material.

17. A method of assembling a vacuum interrupter, the method comprising:
providing a vessel body and at least one endcap, the vessel body comprising an insulating material, the at least one endcap comprising a metallic material;
placing a first side of a reinforcement structure in contact with an exterior surface of the at least one endcap, the reinforcement structure comprising at least one opening that passes from the first side to a second side of the reinforcement structure; and
assembling the vacuum interrupter by brazing the at least one endcap to the vessel body while the reinforcement structure is in contact with the exterior surface of the at least one endcap, wherein
the exterior surface of the at least one endcap comprises a channel, and placing the first side of the reinforcement structure in contact with the exterior surface of the at least one endcap comprises positioning the reinforcement structure on the endcap such that at least a portion of the at least one opening is over at least a portion of the channel, and the method further comprises:
placing the vacuum interrupter in a mold;
injecting an uncured encapsulating material into the mold, the uncured encapsulating material flowing into the channel through the at least one opening and air in the channel flowing out of the channel through the opening; and
allowing the encapsulating material to cure.

18. The method of claim 17, wherein placing the first side of the reinforcement structure in contact with an exterior surface of the at least one endcap comprises brazing the first side of the reinforcement structure to a portion of the exterior surface of the at least one endcap, and brazing the first side of the reinforcement structure to the portion is concurrent with brazing the endcap to the vessel body.

19. A reinforcement structure for an endcap of a vacuum interrupter, the reinforcement structure comprising:
a body comprising a first side and a second side, the body further comprising:
a first opening passing through the body from the first side to the second side, the first opening being configured to receive a portion of the endcap; and
at least one other opening passing through the body from the first side to the second side, wherein
the reinforcement structure is configured to be mounted to an exterior surface of the endcap such that the first side of the body faces the exterior surface of the endcap, the second side of the body faces away from the exterior surface of the endcap, and the at least one other opening is configured to be placed over a recessed region of the end cap and to fluidly couple a region between the first side and the exterior surface of the endcap to a region at the second side.

20. The reinforcement structure of claim 19, wherein the first opening comprises a central passage, and the portion of the endcap comprises a conductive structure configured to electrically connect to an electrically conductive rod of the vacuum interrupter.

* * * * *